Patented Sept. 26, 1922.

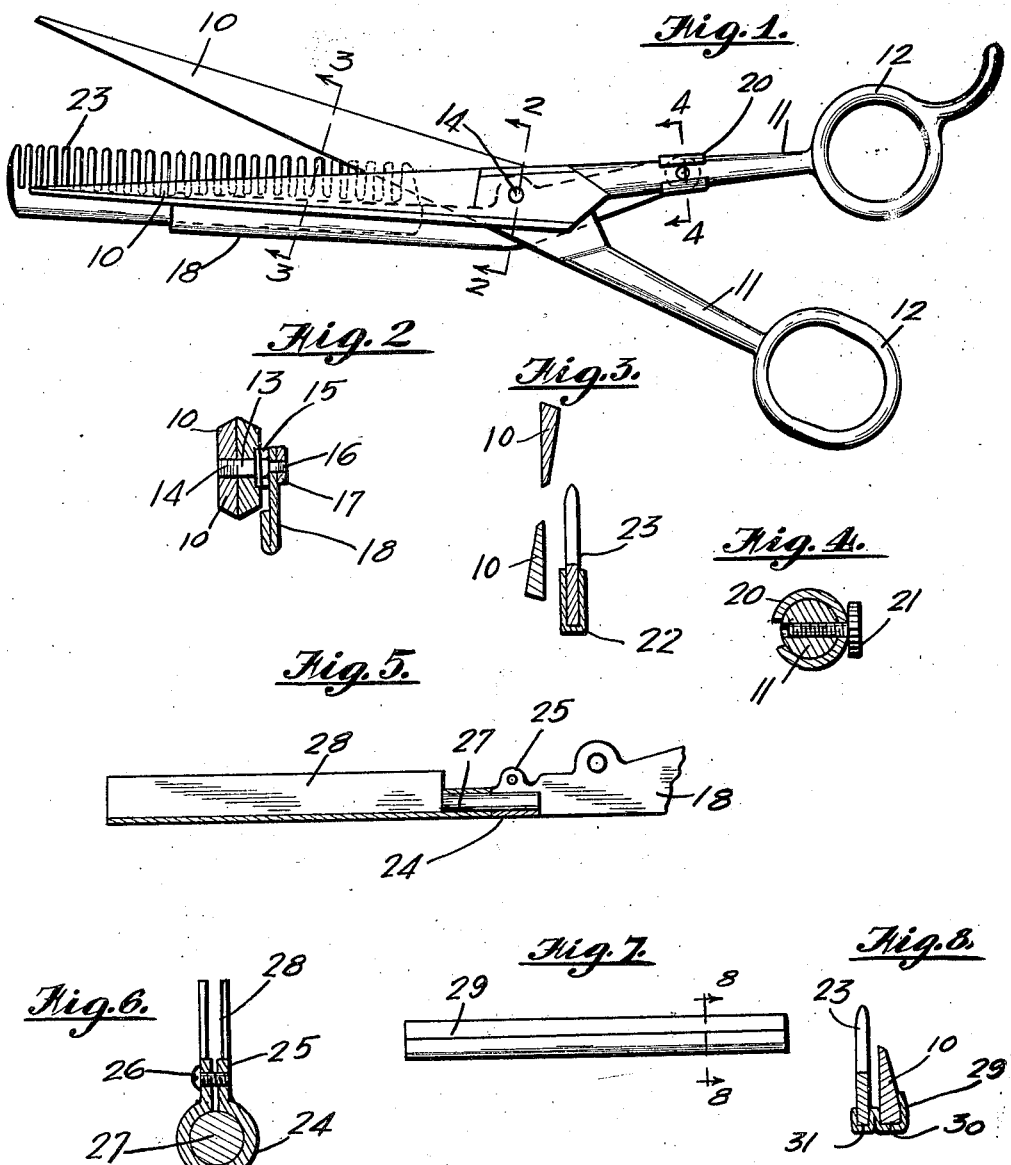

1,430,512

UNITED STATES PATENT OFFICE.

ARCHIE LANGLAIS, OF LOS ANGELES, CALIFORNIA.

HAIR CUTTER.

Application filed July 7, 1921. Serial No. 482,887.

*To all whom it may concern:*

Be it known that I, ARCHIE LANGLAIS, a citizen of the United States, residing at Los Angeles, in the county of Los Angeles and State of California, have invented new and useful Improvements in Hair Cutters, of which the following is a specification.

My invention relates to a hair cutting device, the principal object of my invention being to combine with one of the blades of a pair of shears, a comb that will lift the hair and hold it in proper position to be cut between the blades of the shears, and thus providing a simple and efficient implement that will eliminate much of the time and labor involved in hair cutting operations as ordinarily practiced.

A further object of my invention is to provide a simple and practical comb supporting attachment for one of the blades of a pair of shears, and which attachment permits the comb to be adjusted with respect to the cutting edge of the blade to which it is attached.

With the foregoing and other objects in view, my invention consists in certain novel features of construction and arrangement of parts that will be hereinafter more fully described and claimed and illustrated in the accompanying drawings, in which:

Figure 1 is a side elevational view of a hair cutting device of my improved construction.

Fig. 2 is an enlarged cross section taken on the line 2—2 of Fig. 1.

Fig. 3 is an enlarged cross section taken on the line 3—3 of Fig. 1.

Fig. 4 is an enlarged cross section taken on the line 4—4 of Fig. 1.

Fig. 5 is an elevational view, partly in section, of a modified form of the comb holding attachment forming a part of my invention.

Fig. 6 is an enlarged cross section taken on the line 6—6 of Fig. 5.

Fig. 7 is an elevational view of a further modified form of the comb holding attachment.

Fig. 8 is a cross section taken approximately on the line 8—8 of Fig. 7.

Referring by numerals to the accompanying drawings which illustrate a practical embodiment of my invention, 10—10 designate the blades of a pair of ordinary hair cutting shears, 11—11 the handles that are formed integral with the rear ends of said blades, and 12—12 the eyes or loops on the rear ends of said handles.

The blades 10 are pivotally connected by a pin or bolt 13 having a threaded portion 14 that is seated in one of the blades, and formed integral with said pin or bolt is a noncircular head 15 that is adapted to be engaged by a wrench or like tool for screwing said pin or bolt into or out of the blades and for drawing the same together to regulate the freedom of movement thereof.

Projecting beyond the head 15 is a pin 16, the outer end of which is threaded in order to receive a nut 17. This outwardly projecting pin 16 serves as one of the supports for the comb holding attachment forming a part of my invention, and which attachment comprises an arm 18, preferably formed of suitable sheet metal and having a perforated ear 19 that receives the pin 16 and being retained upon said pin by nut 17 that is tightened upon the threaded portion of said pin. The rear end of arm 18 terminates in an open loop 20 that partially encircles one of the handles 11, and passing through an opening formed in this loop and seated in a threaded aperture formed in said handle is a retaining screw 21.

That portion of the comb holder that is disposed in front of the pivot pin 13 extends alongside of the inner face of the blade to which the arm 18 is connected, and said forward portion is made channel-shape as designated by 22 in order to receive and retain the back portion of a comb 23. Obviously the comb holding member 22 is spaced a sufficient distance away from the blade to which arm 18 is connected to permit the opposite blade to move downwardly into position between the comb and the blade with which it is associated.

In the operation of my improved hair cutting device, the rear portions of the shears are manipulated so that the blades are swung apart, thereby permitting the teeth of the comb to engage and lift the hair so that the ends thereof lie between the cutting edges of the blades, whereupon the blades of the shears are moved toward and past each other by proper manipulation of the handles, thereby cutting off that portion of the hair that lies between the teeth of the comb and over the blade to which said comb is applied.

The channel-shaped member 22 extends for a considerable distance in front of the pivot pin 13 consequently permitting ample longitudinal adjustment of the comb relative to the blade with which it is associated.

In the modified construction illustrated in Figs. 5 and 6, the arm 18 terminates a short distance in front of the pivot pin 13, and said forward end is formed with a short tubular socket 24 having laterally projecting ears 25 in which is seated a screw 26. This socket is adapted to receive a short pin 27 that projects rearwardly from the channel-shaped body portion 28 of the comb holder. The construction just described permits the holder 28 and the comb carried thereby to be rotated slightly in the socket 24, and consequently moving the teeth of the comb toward or away from the cutting edge of the adjacent blade. The holder and comb may be retained in their adjusted positions by tightening screw 26 and consequently clamping the pin 27 in the socket 24.

In the modified construction illustrated in Figs. 7 and 8, the comb holder 29 is formed of sheet metal and provided with a pair of longitudinally disposed channels 30 and 31, the former being adapted to receive the back portion of one of the blades of the shears, and the other channel 31 being adapted to receive the back portion of the comb. Where this form of device is utilized, the body of the holder is positioned upon the blade by relative longitudinal movement of said holder and blade with the back portion of the blade inserted in channel 30. Obviously this form of device dispenses with the arm 18 and the parts utilized for connecting said arm to the handle.

A hair device of my improved construction is comparatively simple, may be easily and cheaply produced, and is very effective in performing its intended functions.

It will be understood that minor changes in size, form and construction of the various parts of my improved hair cutting device may be made and substituted for those herein shown and described without departing from the spirit of my invention, the scope of which is set forth in the appended claims.

I claim as my invention:

1. The combination with a pair of hair cutting shears, of an arm connected to the pivot pin between the shear blades, a connection between said arm and the handle of one of the shear blades, and a channel-shaped holder projecting from the forward end of said arm alongside of the blade to which said arm is connected.

2. The combination with a pair of hair cutting shears, of an arm detachably connected to the pivot pin between the blades of the shears, a detachable connection between the rear end of said arm and the handle of one of the shear blades, and the forward portion of said arm extending alongside and parallel with the shear blade to which the rear portion of said arm is connected and the forward portion of which arm is formed to receive a comb.

3. A comb carrying attachment for hair cutting shears comprising an arm provided intermediate its ends with an aperture adapted to receive a pivot member, means on the rear end of said arm for securing said arm to the handle portion of a shear blade, and the forward portion of said arm being channel-shaped so as to receive and retain a comb.

In testimony whereof I have signed my name to this specification.

ARCHIE LANGLAIS.